United States Patent [19]

Read

[11] Patent Number: 4,556,939
[45] Date of Patent: Dec. 3, 1985

[54] APPARATUS FOR PROVIDING CONFLICT-FREE HIGHWAY ACCESS

[75] Inventor: Edgar L. Read, Carrollton, Tex.

[73] Assignee: Honeywell Inc., Minneapolis, Minn.

[21] Appl. No.: 490,007

[22] Filed: Apr. 29, 1983

[51] Int. Cl.⁴ ............................................. G06F 3/04
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,059,851 | 11/1977 | Nutter, Jr. et al. | 364/200 |
| 4,161,779 | 7/1979 | Spencer et al. | 364/200 |
| 4,281,381 | 7/1981 | Ahuja et al. | 364/200 |
| 4,285,037 | 8/1981 | Von Stetten | 364/200 |
| 4,408,300 | 10/1983 | Shima | 364/900 |

*Primary Examiner*—Harvey E. Springborn
*Attorney, Agent, or Firm*—A. A. Sapelli; J. S. Solakian; L. J. Marhoefer

[57] ABSTRACT

An interface apparatus, which interfaces a communication device to a highway wherein the highway includes a clock line, a data line, and a busy line, comprises a counter element which counts a clock signal transmitted on the clock line to generate a clock value. The counter includes a second input terminal connected to the busy line to disable the counting when a busy signal is present on the busy line. A compare element compares the clock value to a device number value associated with the communication device, each communication device coupled to the highway having a unique device number value, and outputs an enable signal when the clock value and the device number value are equal. A driver element permits data to be transmitted onto the data line in response to the enable signal when the communication device has data to be transmitted. The driver element further causes the busy signal to be generated and coupled onto the busy line of the highway thereby disabling the counter elements of each interface apparatus connected to the highway.

5 Claims, 11 Drawing Figures

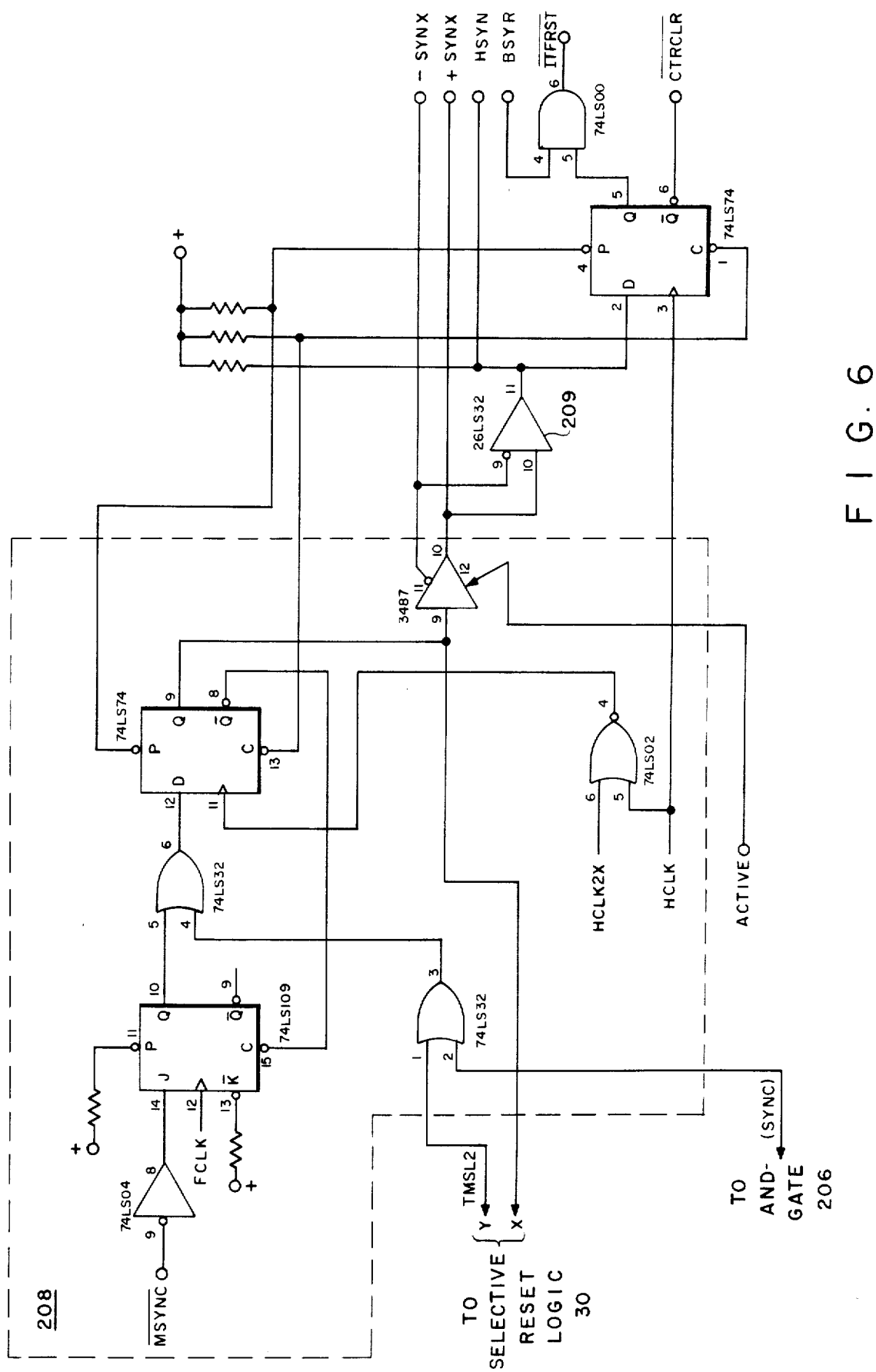
F I G. 6

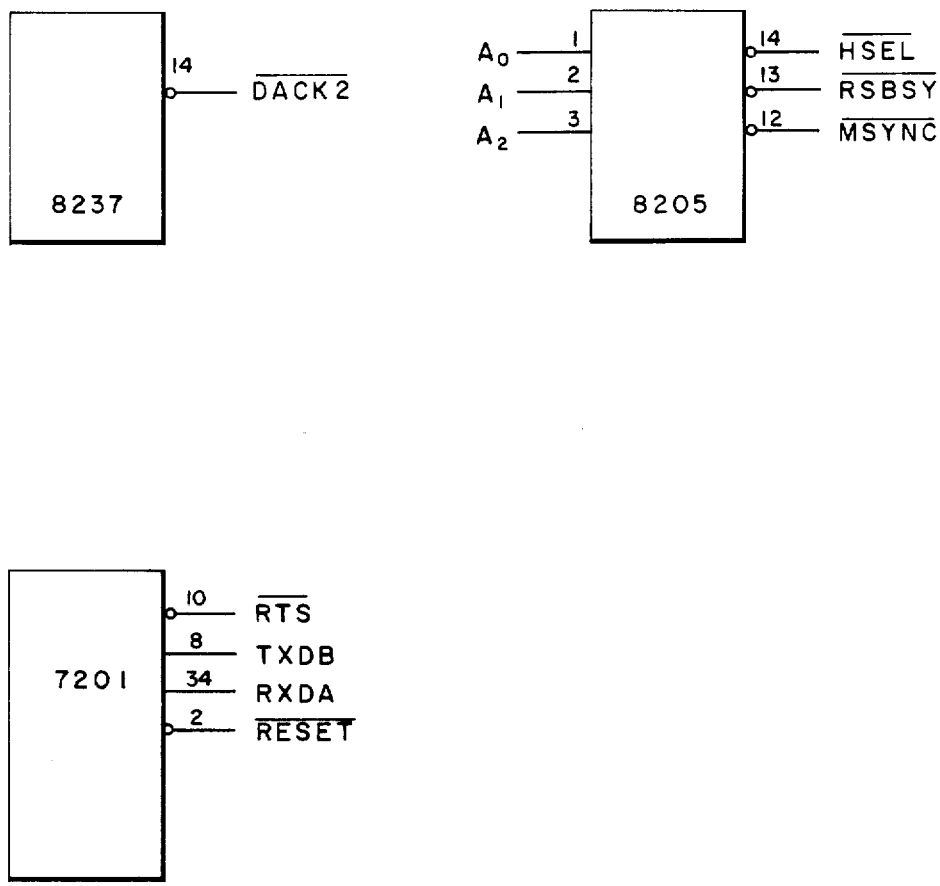
F I G. 8

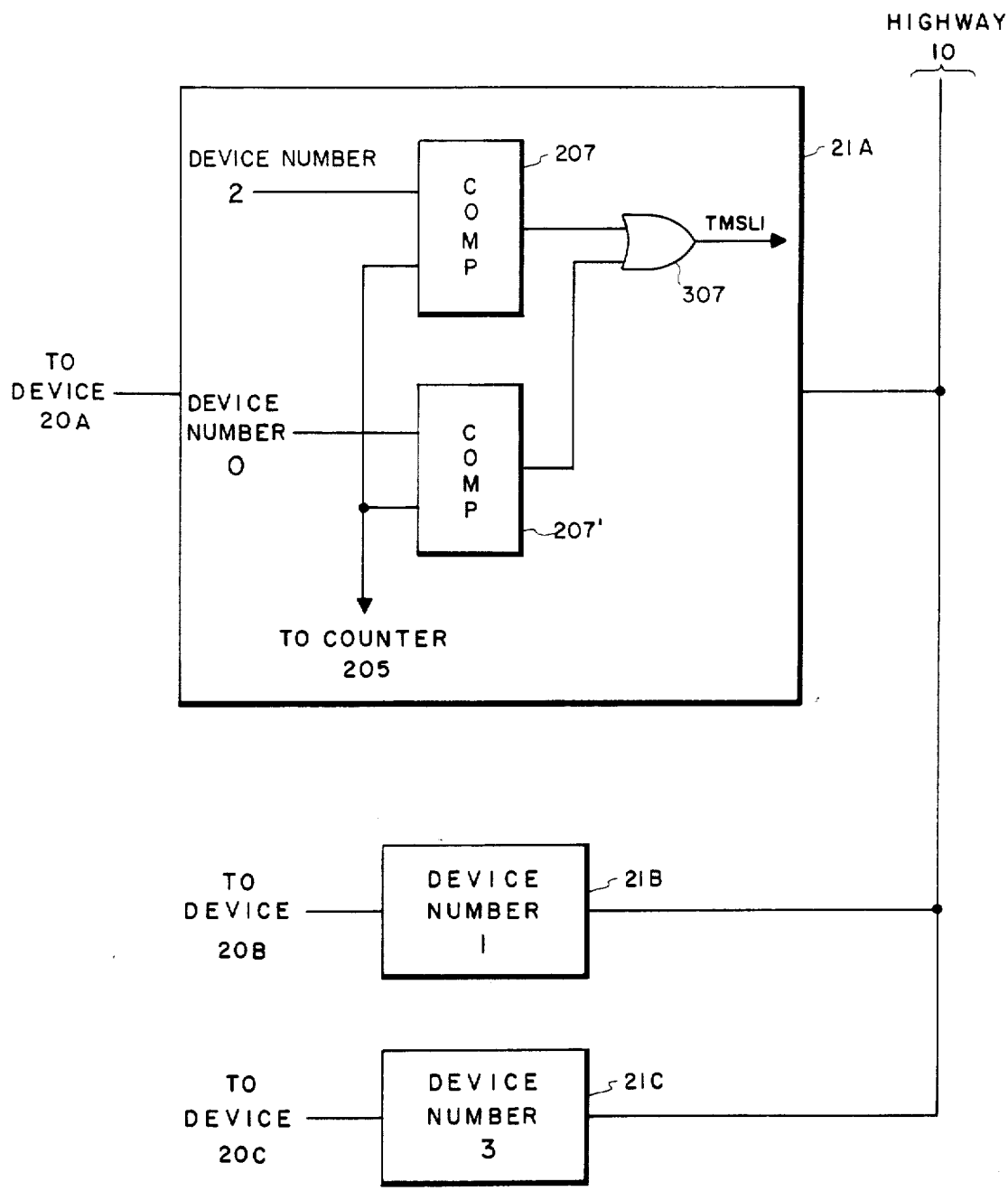
F I G. 11

APPARATUS FOR PROVIDING CONFLICT-FREE HIGHWAY ACCESS

RELATED APPLICATIONS

The present application is related to U.S. patent application, Ser. No. 490,006, entitled "One-for-N Redundancy in a Digital Switch Matrix", by Larry Read, filed on even date herewith, now U.S. Pat. No. 4,497,054, and U.S. patent application, Ser. No. 490,009, now U.S. Pat. No. 4,542,507, entitled "Apparatus for Switch Path Verification", by Larry Read, filed on even date herewith, both related applications assigned to Honeywell Inc., the assignee of the present application, and are incorporated by reference herein.

BACKGROUND OF THE INVENTION

The present invention relates to a system of interprocessor communication via a common bus or highway, which includes a bus interface circuit, or bus arbitrator circuit, for resolving requests for bus accesses, i.e., requests to transmit data on the bus, by communicating devices coupled to the common bus, thereby implementing the system of interprocessor communication.

In digital systems having a plurality of devices, such as controllers and/or processors, it is often times desired or required to have some form of dialog or communication exchange take place between these devices, especially when the functions of the devices must be coordinated.

Many systems exist for interfacing processors. When two processors are to be connected together, past practice has had each processor treat the other as an external input/output device. Commonly, a data channel of one processor is connected to a data channel of the other processor and then, in order to transfer data, each processor must initialize its data channel with address and count information and start the channels reading into memory or writing out of memory, as appropriate. This means that before any data block transfers can occur, both processors must co-operate in performing the requisite initialization.

Another recognized architecture for interprocessor communication is through the use of a common bus. Once again, before any data transfers can occur, the processors must co-operate which can result in tying up the processor for an unduly long period of time. Many co-operating schemes have been implemented and are well known to those skilled in the art, including the techniques of Token Passing, Master Polling of Subordinate Devices, Carrier Sense Collision Detection, and Broadcasting techniques. Most of these techniques requires incorporating a scheme for resolving potential conflicts when simultaneous accesses for the bus are made which can be complex or time consuming.

Hence, it is highly desirable to provide a system for interprocessor communication which avoids conflicts from arising between devices desiring to communicate and which avoids the complexity and time loss of the aforementioned communication systems and communication techniques.

SUMMARY OF THE INVENTION

Therefore, there is supplied by the present invention, a highway interface unit. In a communication system, there is included a plurality of communication devices, each communication device being operatively connected to a common highway via a corresponding interface apparatus, wherein the highway includes a clock line, a data line, and a busy line. The interface apparatus comprises a counter element, having a first input terminal operatively connected to the clock line, for counting a clock signal transmitted on the clock line to generate a clock value. A second input terminal of the counter element is operatively connected to the busy line to disable the counting when a busy signal is present on the busy line. A compare element operatively connected to the counter element compares the clock value to a device number value associated with the corresponding communication device, each communication device having a unique device number value, and outputs an enable signal when the clock value and the device number value are equal, thereby permitting only one communication device to transmit onto the highway. A driver element, operatively connected to the compare element and operatively connected to the corresponding communication device, permits data to be transmitted onto the data line in response to the enable signal when the corresponding communication device has data to be transmitted, and further causes the busy signal to be generated and coupled onto the busy line, thereby disabling the counter element of each interface apparatus.

Thus it can be seen that the highway interface unit does more than arbitrate the conflict for access to the highway but operates in a fashion to implement a communication system which indicates in a predetermined sequence when a device can access the highway. Essentially, the arbitration is accomplished by preventing simultaneous accesses to the highway. Each device is given an opportunity in turn to access the highway in accordance with a predetermined sequence, namely the counter value. The counter vvalue in each counter of each device is essentially a resident "token." When the counter value corresponds to the device number, the device has in essence received the "token" and can access the bus. In addition, the highway interface unit of the present invention can be implemented such that a device may be given priority in the sense that it can have access to the highway a number of times in a sequence and not be limited to a single access in a sequence such as for the token passing technique which requires waiting until the token comes around to the device.

BRIEF DESCRIPTION OF THE DRAWINGS

FIG. 6 shows a logic diagram of the sync circuit of the preferred embodiment of the present invention;

FIG. 8 shows a partial block diagram of an I/O controller showing the origin of some control signal of interest which interface with the preferred embodiment of the highway interface unit;

FIG. 11 shows an example of an alternative embodiment which can allow a communication device a multiple number of accesses to the highway within a cycle for the communication system of the present invention.

DETAILED DESCRIPTION

Figure 1:
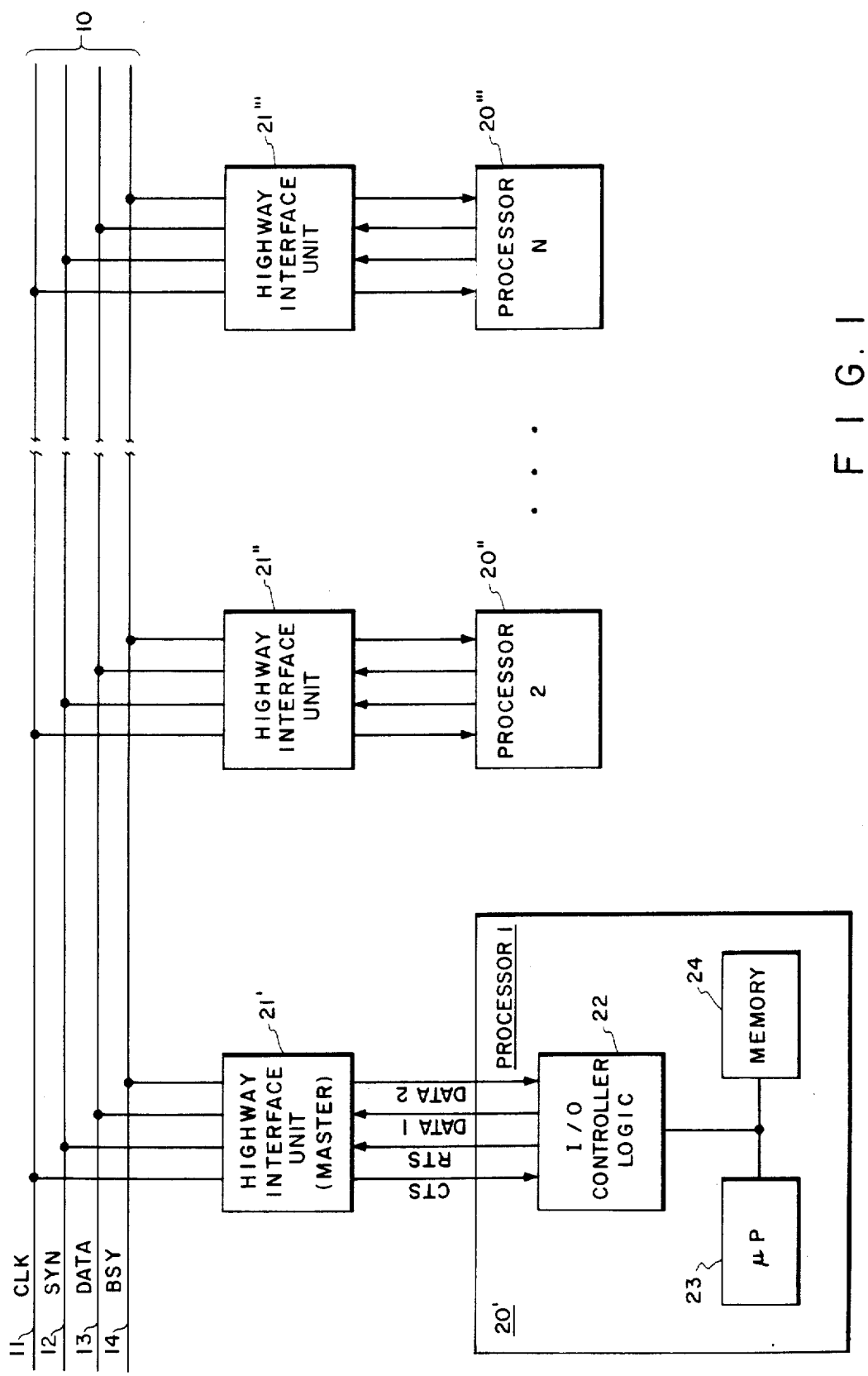
FIG. 1 shows a block diagram of a communication system having devices connected to a common highway.

Referring to FIG. 1, there is shown in block diagram form, an overview of the preferred embodiment of an interprocessor communication system, the system including a plurality of communication devices 20, i.e., processors 1 through processor N, each connected to a common highway 10, or more simply referred to herein as highway 10, via a corresponding highway interface unit 21. The common highway 10 comprises four signal lines, a clock line 11 (CLK), a synchronizing line 12 (SYN), a data line 13 (DATA), and a busy line 14 (BSY). The value of N of the preferred embodiment is theoretically 31, although, from the following discussion, it will become apparent to those skilled in the art that N can be any predetermined number. However, the value of N of the preferred embodiment is limited to 20 due to the limitations of the driver/receiver devices utilized in the implementation of the present invention. The communicating devices 20, or more simply referred to as devices, are shown as processors 20', 20", . . . 20''', although any communicating devices, such as controllers, can be utilized. All the processors 20 of the preferred embodiment are the same, although those skilled in the art will recognize that the processors 20 need not be the same. Highway Interface unit of Processor 1, 21', of the preferred embodiment is designated as the master only because it supplies a clock signal and a sync signal to the CLK line 11 and the SYN line 12, respectively, which will be described further hereinunder. The remaining units are referred to herein as subordinate units. In the preferred embodiment, the master controller performs the resetting function of the subordinate units through a timed sequence and therefore has control of the SYN line 12. It also should be apparent to those skilled in the art that the clock signal and the sync signal can be supplied to the common highway 10 from a source or supply (not shown) external to the processors 20. If the sync signal is supplied from an external source, the resetting function of the subordinate units can be included in the external source.

The processor 20 of the preferred embodiment comprises a microprocessor 23 ($\mu$P), a memory unit 24, and I/O controller logic 22. The microprocessor 23 of the preferred embodiment of the processor 20 includes an INTEL 8086 $\mu$P, along with the necessary supporting logic including circuitry such as an INTEL 8284 clock generator. The memory unit 24 of the preferred embodiment of processor 20 includes an INTEL 2732 PROM. I/O controller logic 22 functions as the external I/O controller of the microprocessor 23. Highway interface unit 21, provides the interface between the common highway 10 and the I/O controller logic 22 to implement the conflict-free interprocessor communication system. Data paths, DATA1 and DATA2, are provided between the highway interface unit 21 and I/O controller logic 22, in addition to control signals, including a request to send (RTS) signal and a clear to send (CTS) signal.

Figure 2:
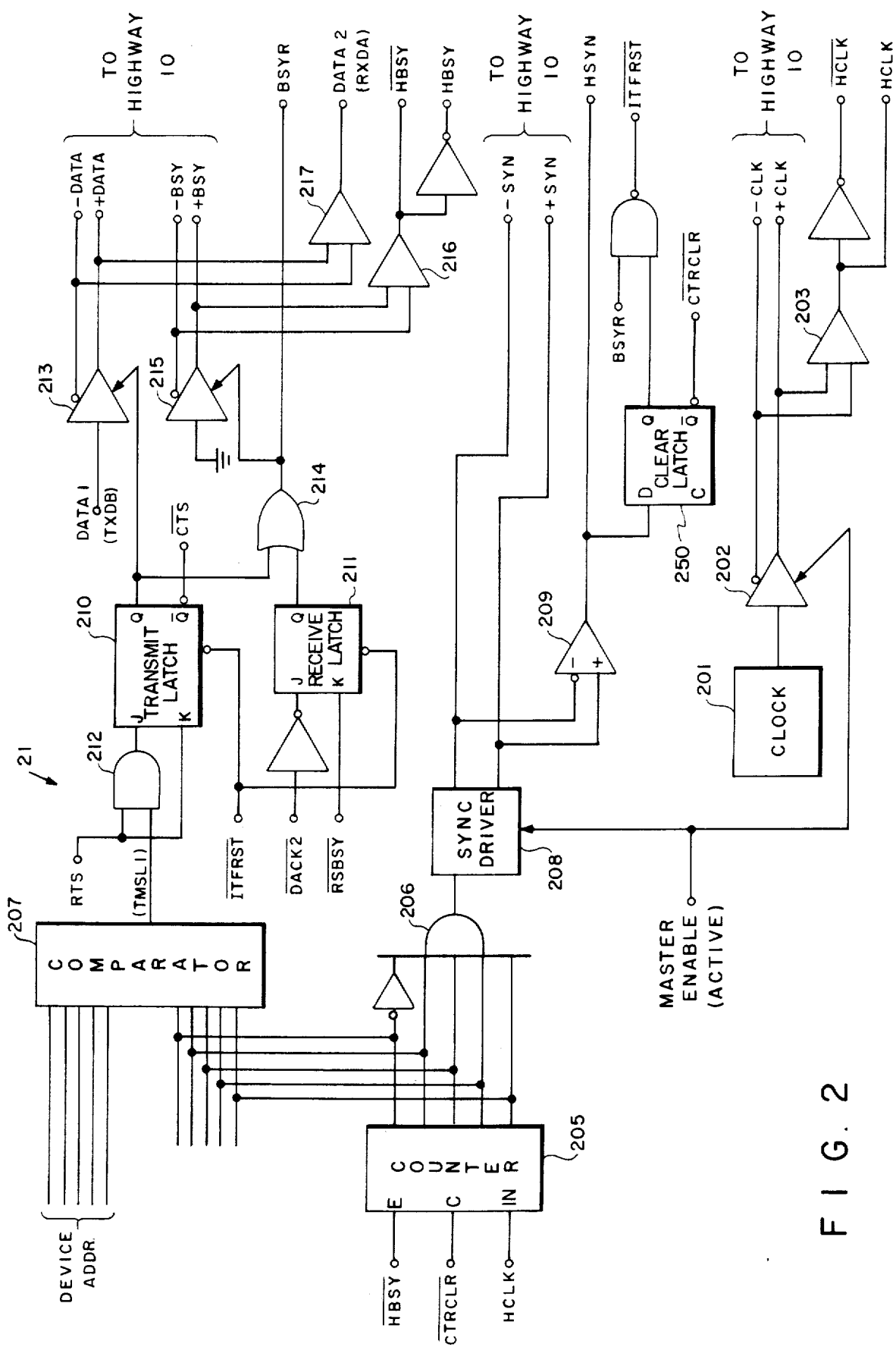
FIG. 2 shows a functional block diagram of a highway interface unit of the present invention.

Referring to FIG. 2, the highway interface unit 21 includes a CLOCK circuit 201 which generates the clock signal. However, only one highway interface unit 21 will output the clock signal to the CLK line 11 of highway 10, namely the highway interface unit 21 designated as the master as mentioned above. The highway interface unit 21 designated as the master will have the MASTER ENABLE (ACTIVE) signal set such that clock line driver 202 is enabled. The clock signal output from clock line driver 202 is a differential signal, $-$CLK and $+$CLK, which is coupled to highway 10. All the highway interface units 21 of the communications system receive the differential clock signal via clock line receivers 203 and generate therefrom the clock signals HCLK and $\overline{HCLK}$.

A counter 205 counts the clock signal HCLK. Counter 205 of the preferred embodiment counts from b 0 to 31, the output of the counter 205 being operatively coupled to an AND gate 206 and a comparator 207. When the counter 205 has a count value of 31, AND gate 206 is enabled and a pulse is coupled to sync driver 208. This pulse is the sync signal and is coupled to the highway 10 via the sync driver 208, when sync driver 208 is enabled. As mentioned above, sync driver 208 is enabled by the MASTER ENABLE (ACTIVE) signal for the highway interface unit 21 designated as the master. The differential sync signal $-$SYN and $+$SYN is coupled to highway 10. The sync signal loads a count of zero into the counter 205 of each device connected to the highway 10 which defines the start of a highway cycle. All the highway interface logic units 21 coupled to highway 10 receive the sync signal via a sync receiver 209 and generate an internal digital signal HSYN. HSYN is utilized to generate two resetting signals, $\overline{ITFRST}$ and e,ovs/CTRCLR/ via a clear latch 250. e,ovs/ITFRST/ is operatively coupled to the unconditional reset terminal of a transmit latch 210 and a receive latch 211. $\overline{CTRCLR}$ is coupled to a reset terminal of counter 205 thereby ensuring the counter 205 of each highway interface unit 21 is synchronized, i.e., the value contained in all the counters is identical. All the highway interface units 21 have associated therewith a unique device address which is coupled to a second set of comparator inputs 207. The device address is a unique hard-wired address for each device. When the value corresponding to the device address is equal to the counter value, a compare occurs resulting in an output of comparator 207 partially enabling AND gate 212. This indicates that the device 20 is permitted to transmit. If the request to send (RTS) signal is received from I/O controller logic 22, indicating that processor 1 has information to transmit over highway 10, the transmit latch 210 is set. The output of transmit latch 210 is coupled to the enable terminal of data driver 213 thereby allowing the I/O controller logic 22 to output data onto the data lines 13 of highway 10, the output data received from I/O controller logic 22 over a line denoted here as DATA1 (TXDB). Further, the output of transmit latch 210 is coupled to an OR gate 214, the output of OR gate 214 providing an enable signal to busy driver 215. When busy driver 215 is enabled the busy signal is set on busy line 14 of highway 10. All the highway interface units 21 coupled to highway 10 receive the busy signal via busy line receiver 216 and generate therefrom the internal digital signal HBSY and e,ovs/HBSY/ . The e,ovs/HBSY/ signal is coupled to counter 205 which disables the counter 205 from counting additional clock pulses thereby freezing the counter value stored in the counter. At this point in time, the counter value in counter 205 will be the same for all the highway inteface units 21. The format of the data transmitted on a data line is controlled by I/O controller logic 22 and may follow any predetermined protocol sequence, the protocol sequence of the preferred embodiment of the present invention is the SDLC protocol well known to those skilled in the art. All the highway interface units 21 receive the data via data line receiver 217 and couple the received data, DATA2, to the I/O controller logic 22. The designated receiving device, upon processing the information initially received and recognizing it is to be the receiver, transmits an acknowledge signal to its highway interface logic unit 21 (DACK2) setting the receive latch 211. The output of the receive latch 211 is coupled to the OR gate 214 enabling the busy line driver 215 of the receiver highway interface unit 21. Thus, the receiving highway interface unit 21 also maintains the busy signal to highway 10. When the transmitting processor 20 has completed the data transmission, RTS is dropped resetting transmit latch 210 thereby removing the enable signal from data line drive 213. In addition, the enable signal is removed from busy driver 215, thereby removing the busy signal transmitted to highway 10 by the transmitting highway interface unit 21. However, the receiving device stil maintains the busy signal to highway 10 allowing the receiving device to complete any message processing necessary. When all the processing has been completed by the receiving device, receiver latch 211 is reset removing the enable signal to busy driver 215 of the receiving highway interface unit 21, thereby removing the busy signal transmitted onto highway 10 by the receiving device. At this point in time the busy signal is entirely removed from the highway, and the $\overline{HBSY}$ signal is removed from the input to all the counters 205 thereby enabling the counters 205 to proceed counting the clock signal, HCLK. Since each highway interface unit 21 has a unique device address, only one processor can have access to the highway 10 at any time, thus no conflicts for bus accesses can occur. Once a device has access to the bus the device can transmit any quantities of data consistent with the predetermined protocol. As mentioned above, in the preferred embodiment of the present invention, theoretically 31 devices may be coupled to the highway 10 since the counter counts from 0 to 31 (although due to implementation limitations only 20 devices can be coupled to the highway 10), the count of 31 being reserved for the generation of the sync signal. Further, as mentioned above, it will be recognized by those skilled in the art that the clock and sync logic need not reside in the highway interface logic unit but may be made available to the bus from an external unit (not shown).

Figure 3:
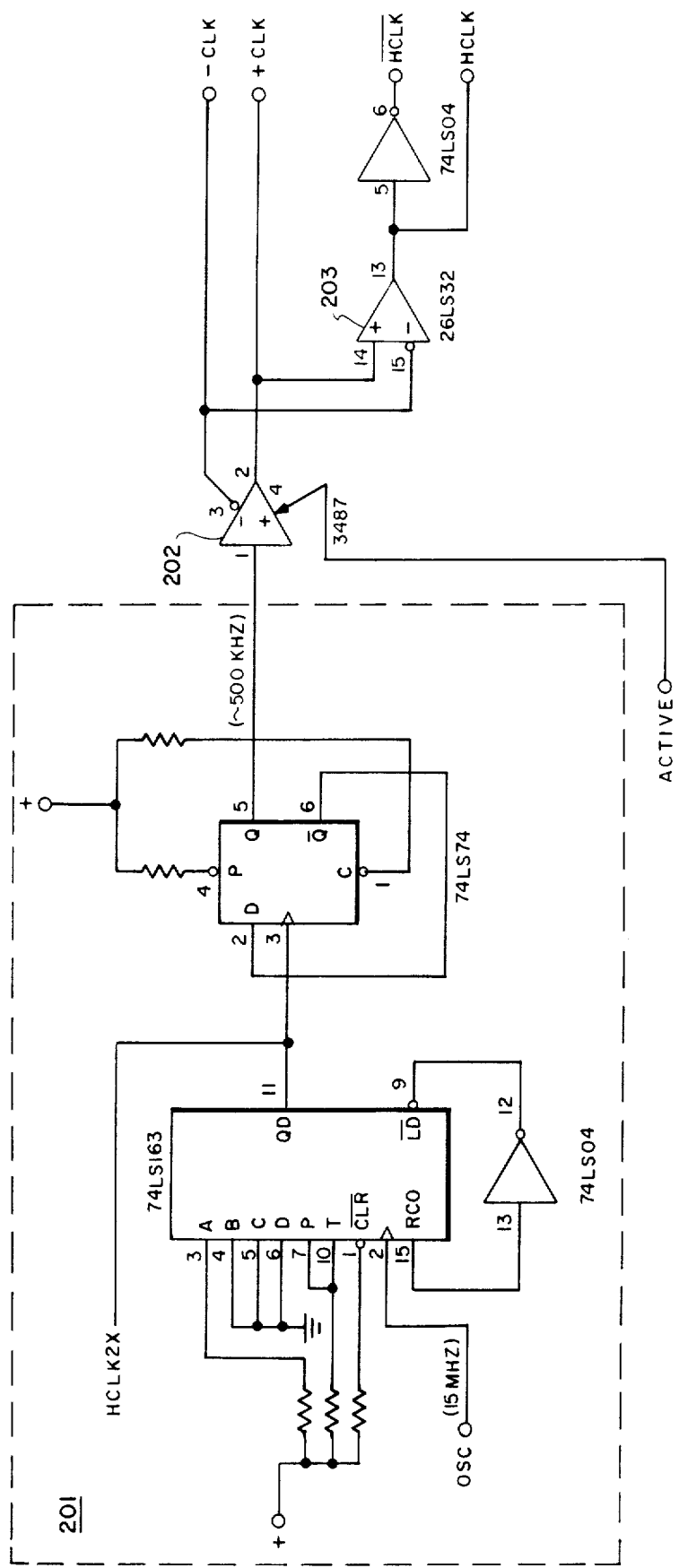
FIG. 3 shows a logic diagram of the clock circuit of the preferred embodiment of the highway interface unit.
Figure 4:
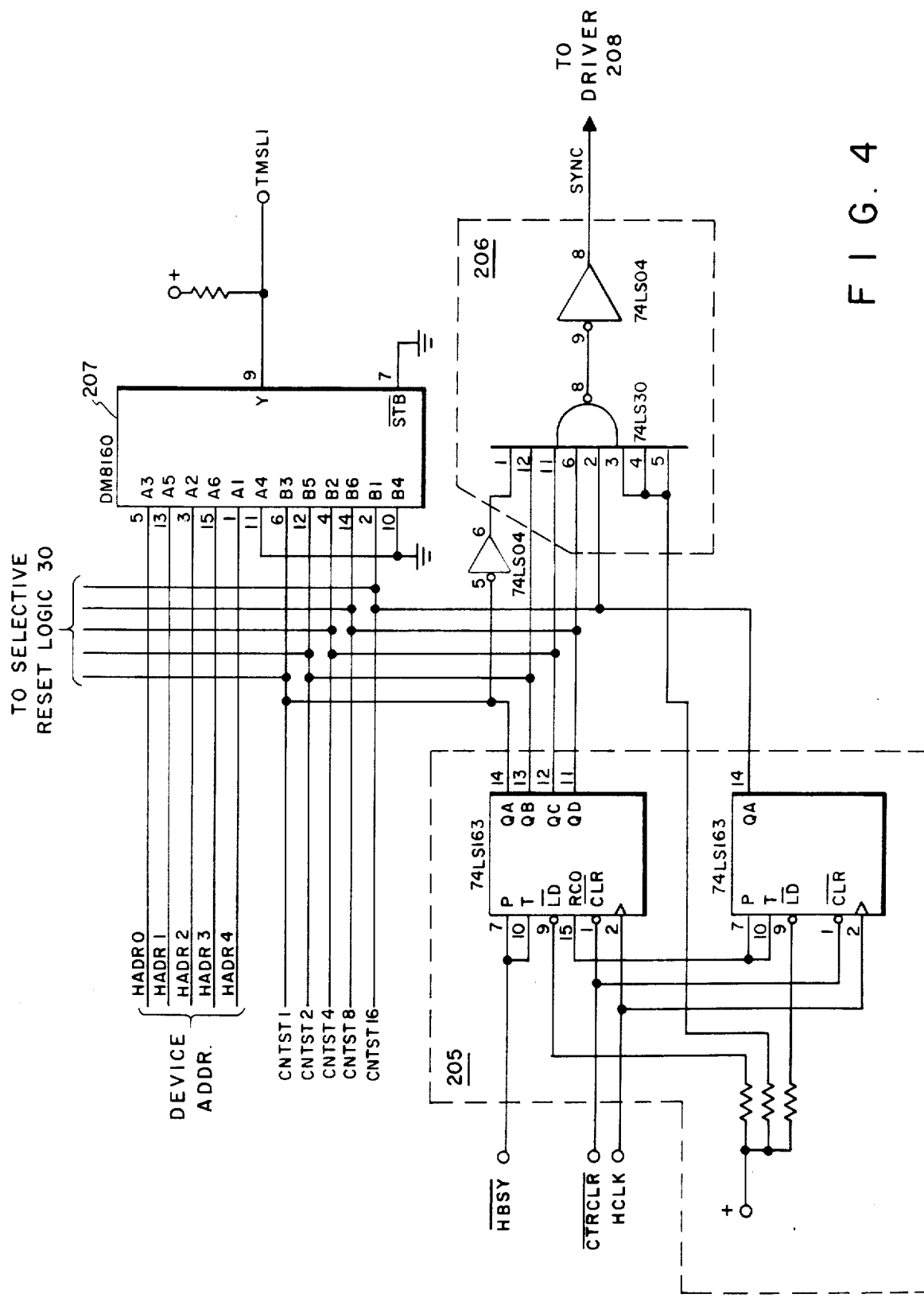
FIG. 4 shows a logic diagram of the counter circuit of the preferred embodiment of the highway interface unit.
Figure 5:
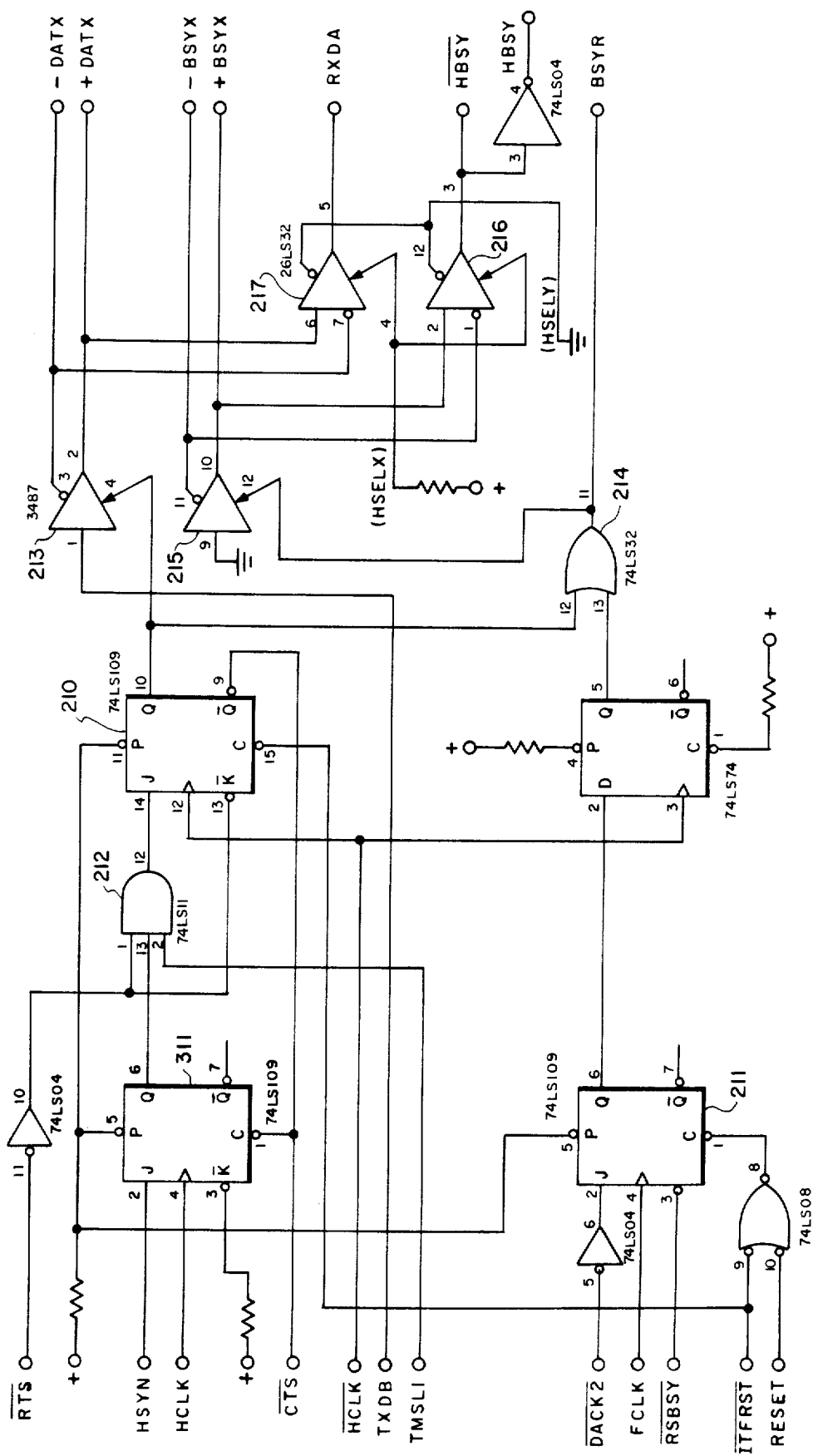
FIG. 5 shows a logic diagram of the transmit and receive logic of the preferred embodiment of the present invention.

As shown in FIG. 3, the clock 201 of the preferred embodiment is implemented utilizing a 74LS163 integrated circuit chip driven by a 15 MHZ clock and outputting approximately a 500 KHZ clock signal. Clock line driver 202 is implemented utilizing a DS3487 integrated circuit and clock line receiver is implemented utilizing a 26LS32 integrated circuit. As shown in FIG. 4, counter 205 of the preferred embodiment is implemented utilizing cascaded ICs 74LS163. AND-gate 206 utilizes a 74LS30 integrated circuit. Comparator 207 utilizes a National Semiconductor compare IC DM8160. As shown in FIG. 5, AND-gate 212 uses a 74LS11 integrated circuit. A synchronizing enabling signal is shown as an additional input to AND-gate 212, the synchronizing enabling signal being generated by a syncing gate 311. In the preferred embodiment, syncing gate 311 prevents a device from acquiring the highway more than once in the same highway cycle. Transmit latch 210 and receiver latch 211 are each implemented by a J-K flip flop, integrated circuit 74LS109, and OR-gate 214 is implemented by a 74LS32 IC. DATA line driver 213 and BSY line driver 215 is implemented via a DS3487 IC. DATA line receiver 217 and BSY line receiver 216 are implemented by a 26LS32 IC. The DATA line is denoted DATX and DATY since the preferred embodiment is implemented to contain a duplicate control highway X and Y. All four signal lines are duplicated resulting is eight signal lines (and since the line differential signals there are a total of sixteen wires). The implementation of the SYNC driver 208 is shown in FIG. 6. Driver 208 is implemented by a DS3487 driver circuit driven by the output of AND-gate 206 or from a sync signal e,ovs/MSYNC/ input from I/O controller logic 22. FCLK is an output of a 74S241 driver driven by HCLK. SYN line receiver 209 is implemented with a 26LS 32 line receiver.

Figure 7:
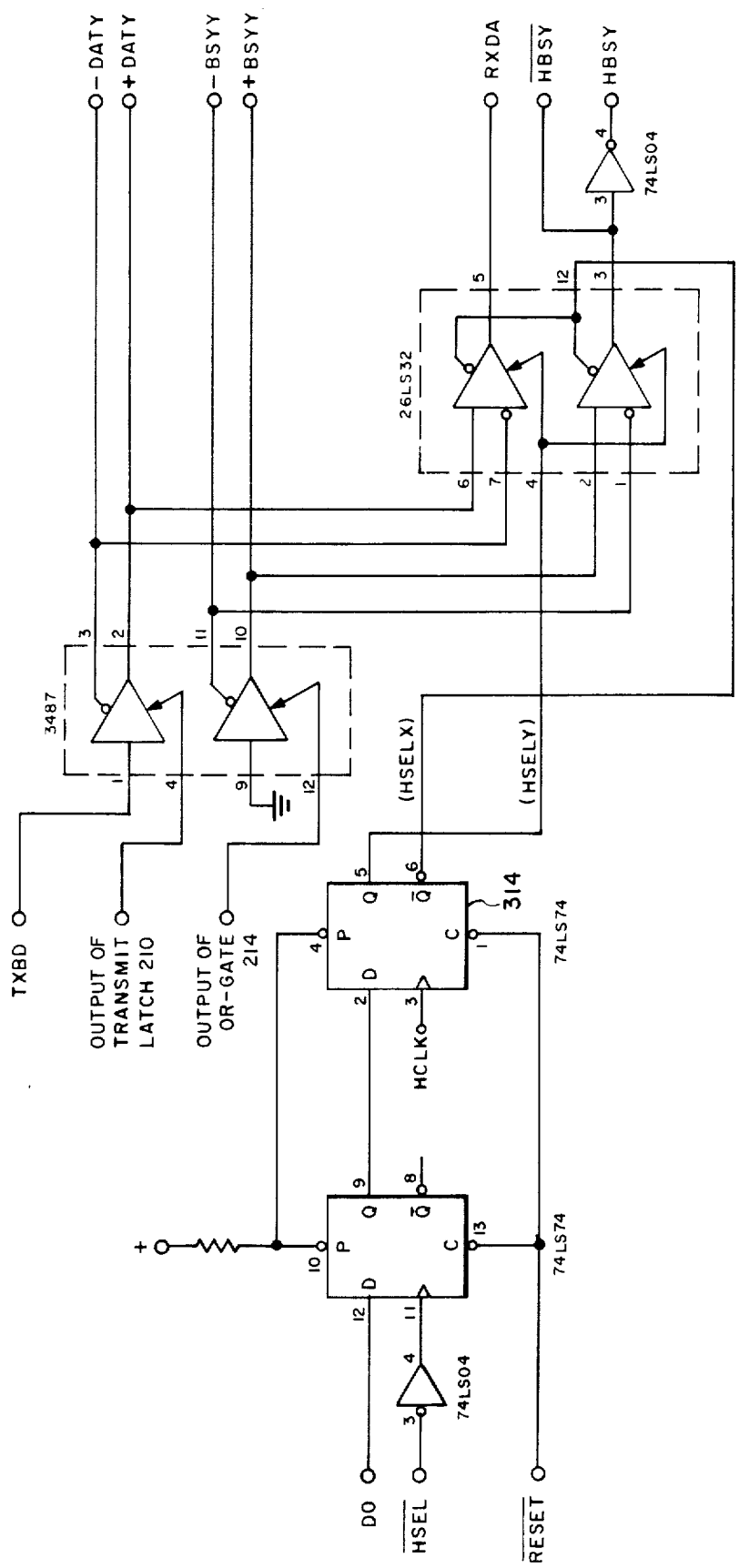
FIG. 7 shows a partial logic diagram of the select logic of the preferred embodiment of the present invention.

The transmission is accomplished over both X and Y highway, but only one highway is selected for receiving as shown, in part in FIG. 7, the selection being accomplished by select flip-flop 314. The I/O controller 22 includes an INTEL 8237A DMA controller, an NEC PD7201 multi-protocol serial controller, and an INTEL 8205 decoder, as shown in part in FIG. 8.

Figure 9:
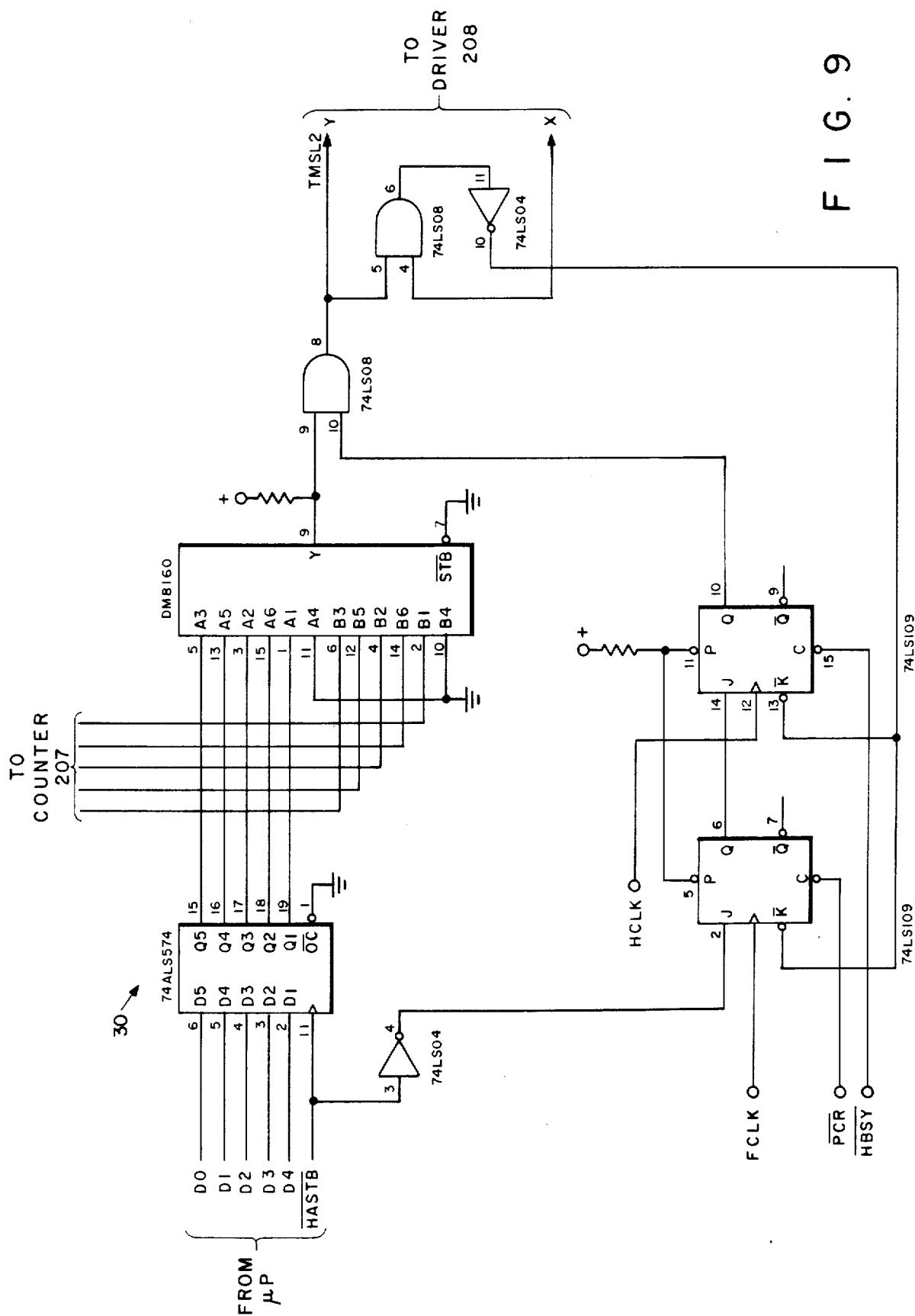
FIG. 9 shows a logic diagram of the selective reset logic of the preferred embodiment of the highway interface unit.

Referring to FIG. 9, there is shown a logic diagram of the selective reset logic 30 referenced above. The selective reset logic 30 is used to reset a selected microprocessor and also clear the busy signal. An error condition could exist in which a highway interface unit 21 had sent a busy signal for either a transmit or receive sequence. If the highway interface unit 21 failed before the completion of a sequence, the BSY line 14 would remain set, thereby halting highway communications. Diagnostic software of the microprocessor 23 would detect that the BSY line 14 was being held continuously. Once detected the master microprocessor 23 would pulse the highway SYN line 12, via the selective reset logic 30. As a result of action by the selective reset logic 30 all the counters 205 would reset to zero, and the highway interface units 21 that are holding BSY line 14 would have their BSY logic reset. At this point, the failed highway interface units 21 would still be in a failed condition, but now the highway 10 would be free for communications. The busy signal can also be cleared by the sync driver 208 of FIG. 6. The e,ovs/MSYNC/ signal is generated by the microprocessor 23 of the master device independent of the counter value to clear a busy error condition.

Figure 10:
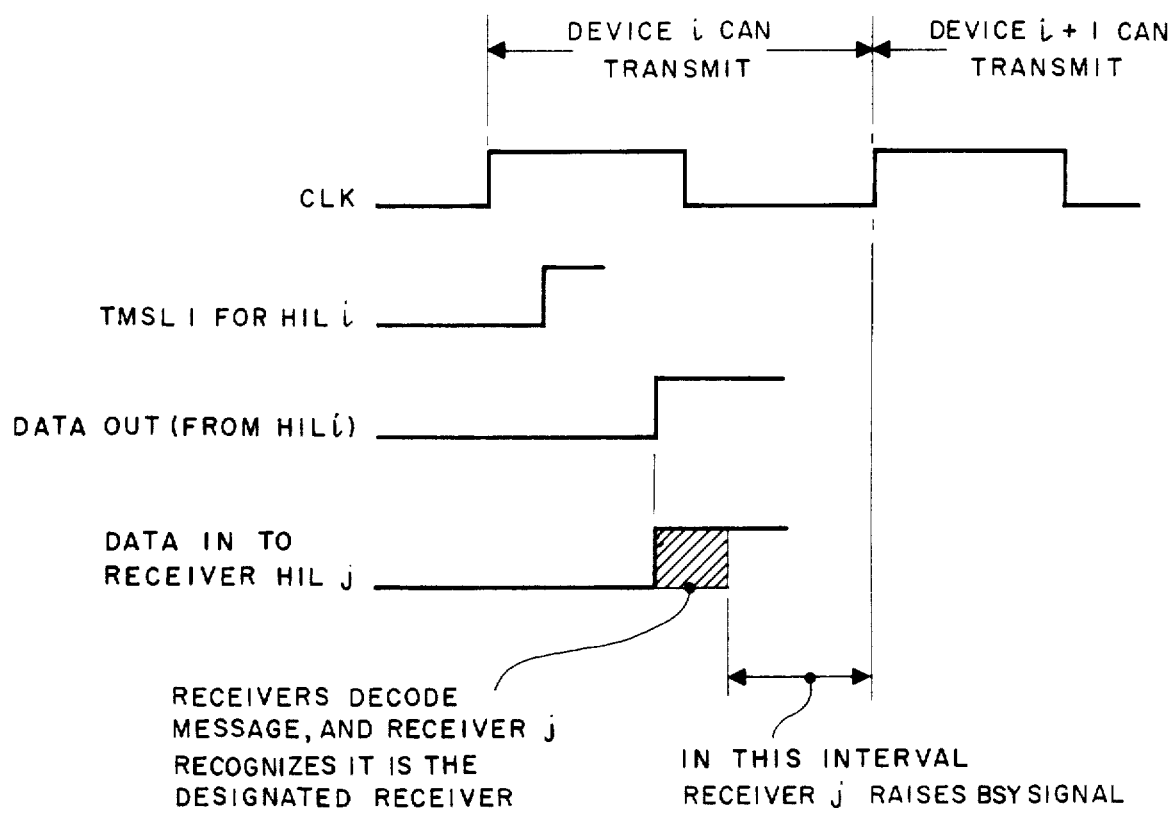
FIG. 10 shows timing waveforms for generation by an alternative scheme of communication of the present invention, wherein the busy signal is generated solely by the receiver highway interface unit.

Various alternative implementations can be developed incorporating the general features of the present invention. One alternative can include an implementation in which the receiver only raises the busy signal. Such a system would be feasible where the receiver accepts data transmitted, recognizes it is the intended receiver, and outputs the busy signal before the next clock pulse, as shown in FIG. 10. This would ensure the single device 20 has access to the line since the busy signal will disable all the counters 205 from proceeding to the next count value and granting the next device 20 access to the line. Such an alternative scheme can be timing dependent or protocol dependent and may be implemented by the embodiment shown.

Referring to FIG. 11, there is shown an alternative embodiment of the highway interface unit 21 which permits a device a multiple numberr of accesses to highway 10 during a given cycle. In the example of FIG. 11, and not intended in any way to limit the alternative embodiment of the present invention, the highway interface unit 21A includes the same logic as shown in FIG. 2. Since a multiple number of accesses of the highway 10 are desired in this alternative embodiment, syncing gate 311 is removed. In addition, there is included an additional comparator 207′, having a first set of inputs coupled to counter 205. The first comparator 207 has a device number of two and the second comparator 207′ has a device number of zero coupled to the second set of inputs to the comparators. The output of each comparator is coupled to an OR gate 307 which outputs the TMSL1 signal indicating the device is permitted access to the bus. In this example, two additional devices 20B and 20C are operatively connected to highway 10 via the corresponding highway interface unit 21B and 21C, respectively, highway interface unit 21B and highway interface unit 21C being as shown in FIG. 2. Highway interface unit 21B has assigned a device number one and highway interface unit 21C has assigned a device number of three. The counters of the system of FIG. 11, count from zero to four, four being reserved for the generation of the sync signal. When the counter has a value of zero, device 20A will have access to the bus, when the counter value has a value of one device 20B will have access to the bus, when the counter has a value of two device 20A will have access to the bus, and when the counter has a value of three, device 20C will have access to the bus. Hence, the devices will have access in the bus in the sequence of 20A, 20B, 20A and 20C. Thus it can be seen that device 20A will have access to the highway twice each cycle. In a like manner, the highway interface units of the corresponding device may be programmed for any desired sequence, accounting for any high or low activity anticipated for a particular device.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

I claim:

1. In a communication system, which includes a plurality of communication devices, each communication device being operatively connected to a common highway via a corresponding interface apparatus, wherein said highway includes a clock line, a data line, and a busy line, each interface apparatus comprising:
    (a) counter means, having a first input terminal operatively connected to said clock line, for counting a clock signal transmitted on said clock line to generate a clock value, and having a second input terminal operatively connected to said busy line to disable said counting when a busy signal is present on said busy line;
    (b) compare means, operatively connected to said counter means, for comparing said clock value to a device number value, associated with the corresponding communication device, each communication device having a unique device number value, to output an enable signal when said clock value and said device number value are equal, thereby permitting only one communication device to transmit onto the highway; and
    (c) driver means, operatively connected to said compare means and operatively connected to the corresponding communication device, for permitting data to be transmitted onto said data line in response to said enable signal when said corresponding communication device has data to be transmitted, and further including means for causing the busy signal to be generated and coupled onto the busy line, thereby disabling the counter means of each interface apparatus.

2. An interface apparatus, according to claim 1, further comprising:
    clock driver means, having an input terminal adapted to receive a clock enable signal, operatively connected to said clock line, for generating said clock signal, whereby a preselected interface apparatus provides said clock signal to said clock line in response to said clock enable signal.

3. An interface apparatus, according to claim 1, wherein the highway of the communication system further includes a sync line, the interface apparatus further comprising:
    sync driver means, having an input terminal adapted to receive a sync enable signal, operatively connected to said counter means, for generating a sync signal in response to a predetermined count value of said counter means to output said sync signal to said sync line in response to said sync enable signal, thereby synchronizing the count value of each counter means of each interface apparatus.

4. An interface apparatus according to claim 1, further comprising:
    receive driver means, operatively connected to said busy line, for generating a busy signal in response to an acknowledge signal from said corresponding commmunication device indicating it is to receive the data transmitted onto said data line.

5. In a communication system, which includes a plurality of communication devices, each communication device being operatively connected to a common highway via a corresponding interface apparatus, wherein said highway includes a clock line, a data line, and a busy line, each interface apparatus comprising:
    (a) counter means, having a first input terminal operatively connected to said clock line, for counting a clock signal transmitted on said clock line to generate a clock value, and having a second input terminal operatively connected to said busy line to disable said counting when a busy signal is present on said busy line;
    (b) at least one compare means, each compare means operatively connected to said counter means, and each compare means having a unique device number coupled thereto, each unique device number corresponding to a highway access within a cycle, for comparing said clock value to the unique device number value, to output an enable signal each time said clock value and said unique device number value are equal, thereby permitting the communication device to transmit onto the highway each time the clock value and the unique device number are equal; and (c) driver means, operatively connected to said compare means and operatively connected to the corresponding communication device, for permitting data to be transmitted onto said data line in response to said enable signal when said corresponding communication device has data to be transmitted, and further including means for causing the busy signal to be generated and coupled onto the busy line, thereby disabling the counter means of each interface apparatus.

* * * * *